Oct. 11, 1966    HIDEO SEKIGUCHI    3,277,551
CONCRETE BLOCK MOLDING MACHINES
Filed Oct. 7, 1963    5 Sheets-Sheet 1

INVENTOR
Hideo Sekiguchi

BY
OSTROLENK, FABER, GERB & SOFFEN
ATTORNEYS

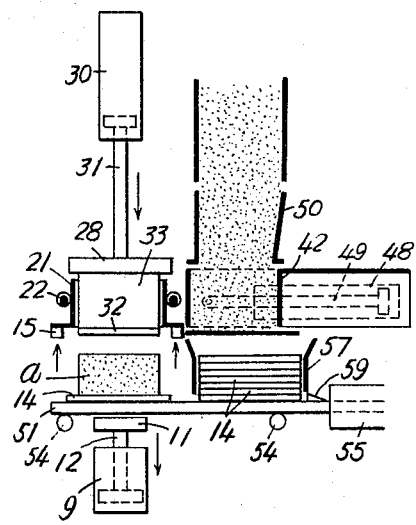
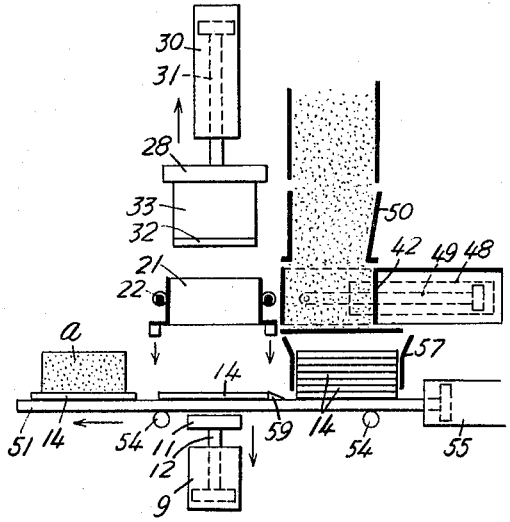
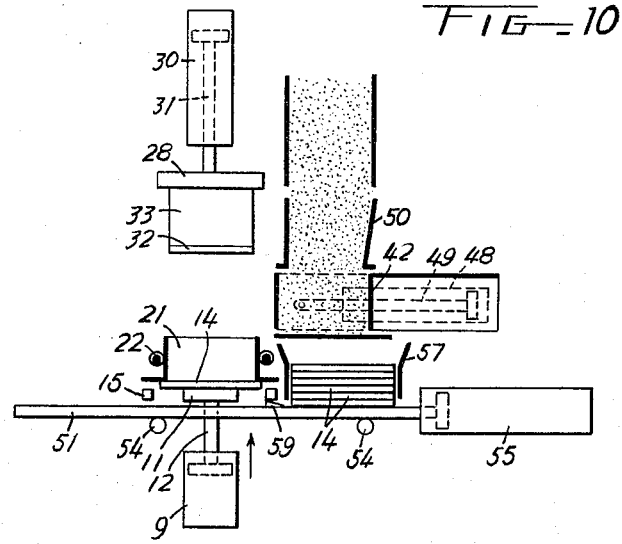

United States Patent Office 3,277,551
Patented Oct. 11, 1966

3,277,551
CONCRETE BLOCK MOLDING MACHINES
Hideo Sekiguchi, Maebashi, Japan, assignor to Kabushiki Kaisha Sekiguchi Seisakusho, Tokyo, Japan, a corporation of Japan
Filed Oct. 7, 1963, Ser. No. 314,279
1 Claim. (Cl. 25—41)

The present invention relates to the production of concrete blocks and more particularly to a concrete block molding machine having a molding frame placed on a pallet to form the bottom plate thereof, wherein concrete raw material comprising cement added with gravel, broken stone or other suitable material is kneaded with water, deposited in said molding frame, and wherein pressure is applied by a pressure mold while vibrations are imparted to the molding frame.

The principal object of the present invention is to provide such a concrete block molding machine as recited above wherein the vibration acting on the molding frame during the molding operation exerts as little vibration as possible on the machine frame, and wherein no direct pressure is applied to the molded block when the block is stripped from the molding frame.

According to the present invention, there is provided an improved concrete block molding machine characterized in that molding operation is performed by depositing raw material in a molding frame, which has on its outside surface an eccentric rotator serving for giving small vibration to the molding frame upon its rotation. The frame is pressed by a pressure mold under the condition that the molding frame is supported by a pallet which is separated from the machine frame and is given small vibration; and removal of the molded block from the molding frame is carried out in such a manner that after completion of molding the pressure mold is fixed not to move upwardly and, in relation to said pressure mold the molding frame is moved upwardly; and then the molded block is carried out from the machine together with the pallet.

It is therefore one object of the instant invention to provide automatic means for producing concrete blocks of superior quality and homogeniety.

Another object of the invention is to provide means for forming concrete blocks and the like wherein the mold frame is removed from the formed blocks without removing the pressure exerted on the blocks.

Another object of the invention is to provide means for forming concrete blocks and the like wherein the vibrations imparted to the mold during the pressing operation are effectively cushioned from the machine main frame.

Still another object of the instant invention is to provide means for molding concrete blocks and the like comprising means for imparting vibrations to the mold frame which is mounted to minimize the amount of vibration imparted to the machine main frame.

Another object of the instant invention is to provide means for molding concrete blocks and the like wherein novel piston means are employed for both pressing the concrete and cushioning the vibrating mold from the machine main frame during the pressing operation.

Still another object of the instant invention is to provide a machine for molding concrete blocks and the like comprising novel pallet feeding means for providing a pallet employed in the molding operation.

Still another object of the instant invention is to provide a machine for molding concrete blocks and the like comprising novel pallet feeding means for providing a pallet employed in the molding operation wherein the pallet serves as the mold base member so well as the means for delivering a finished concrete block upon completion of the pressing operation.

These and other objects of the invention will become apparent when reading the accompanying description and drawings in which:

FIGURES 4–10 are explanation diagrams showing the order of molding operation of a concrete block by the present invention machine.

Figure 1:
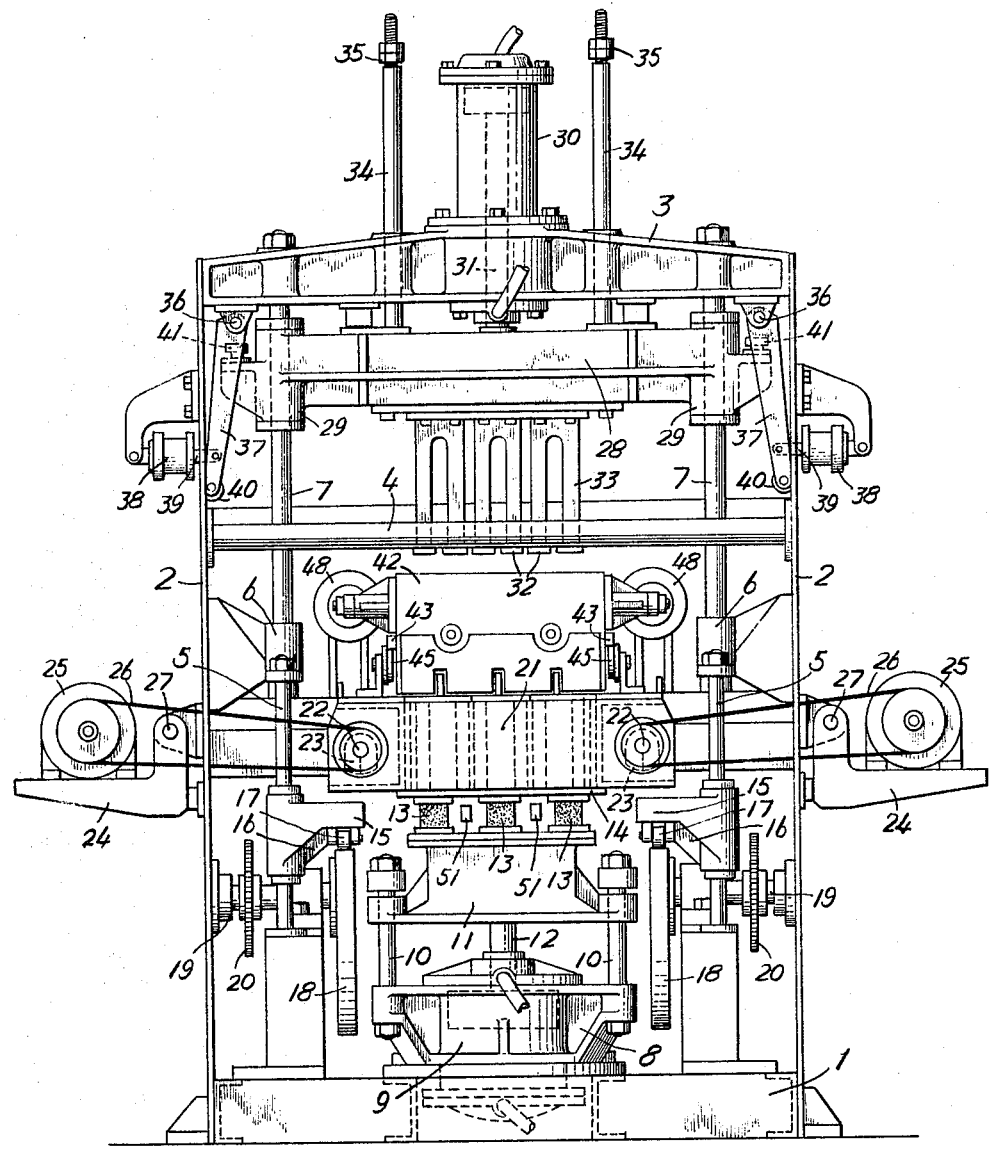
FIGURE 1 is a front view of the machine with its molding frame being placed in the condition where a block is molded.

The construction and operation of the present invention concrete block molding machine will be explained with reference to the accompanying drawings as follows:

Referring to the drawings, numeral 1 denotes a machine base, on which are mounted a pair of right and left machine frame plates 2—2 having at the upper portion thereof a pair of front and rear lateral frames 3—3 bridged therebetween and at the middle portion thereof, a pair of front and rear lateral bars 4—4, thereby forming a machine frame by these and other members.

Each pair of guide poles 5—5 are mounted at the right and left, respectively, on the upper surface of the machine base 1, and on either side the pair of guide poles 5—5 are connected at their upper ends with respective attaching arms 6—6 projecting inwardly from the machine frame plate 2, and between the pair of attaching arms 6—6 and the upper lateral frame 3 are provided a pair of guide poles 7—7 disposed between the pair of guide poles 5—5. Between the guide poles 5—5, there is provided a piston cylinder 9 within a base frame 8 mounted on the machine base 1, and a supporting frame for receiving a pallet is slidably attached to guide poles 10 projecting upwardly from the base frame 8, so that the same may be moved upwardly and downwardly along the poles 10 by the piston rod 12 of the piston cylinder 9. A number of legs 13 made of an elastic material such as rubber, for example, project upwardly from the upper surface of the supporting frame 11 so that the same can support on their upper surfaces a pallet 14 forming the bottom plate of a molding frame for molding a block.

The guide poles 5—5 on either side have inwardly projecting arms 15—15 which are slidable along said guide poles 5—5, and each supporting frame 16 connecting the supporting arms 15—15 on either side has a roller 17 attached thereto and is supported through said roller 17 on a respective cam wheel 18 disposed therebelow, so that when the cam wheel 18 is rotated by a chain wheel 20 on the same axis 19 the supporting frame 16 may be moved upwardly and downwardly. By rotating the right and left chain wheels 20 and 20 simultaneously and at the same speed, reciprocating movement of both supporting frames 16 and 16 occur in substantial synchronism. The reciprocating movement of frame 16 effects the up and down movement of a molding frame 21 supported thereon.

Figure 2:
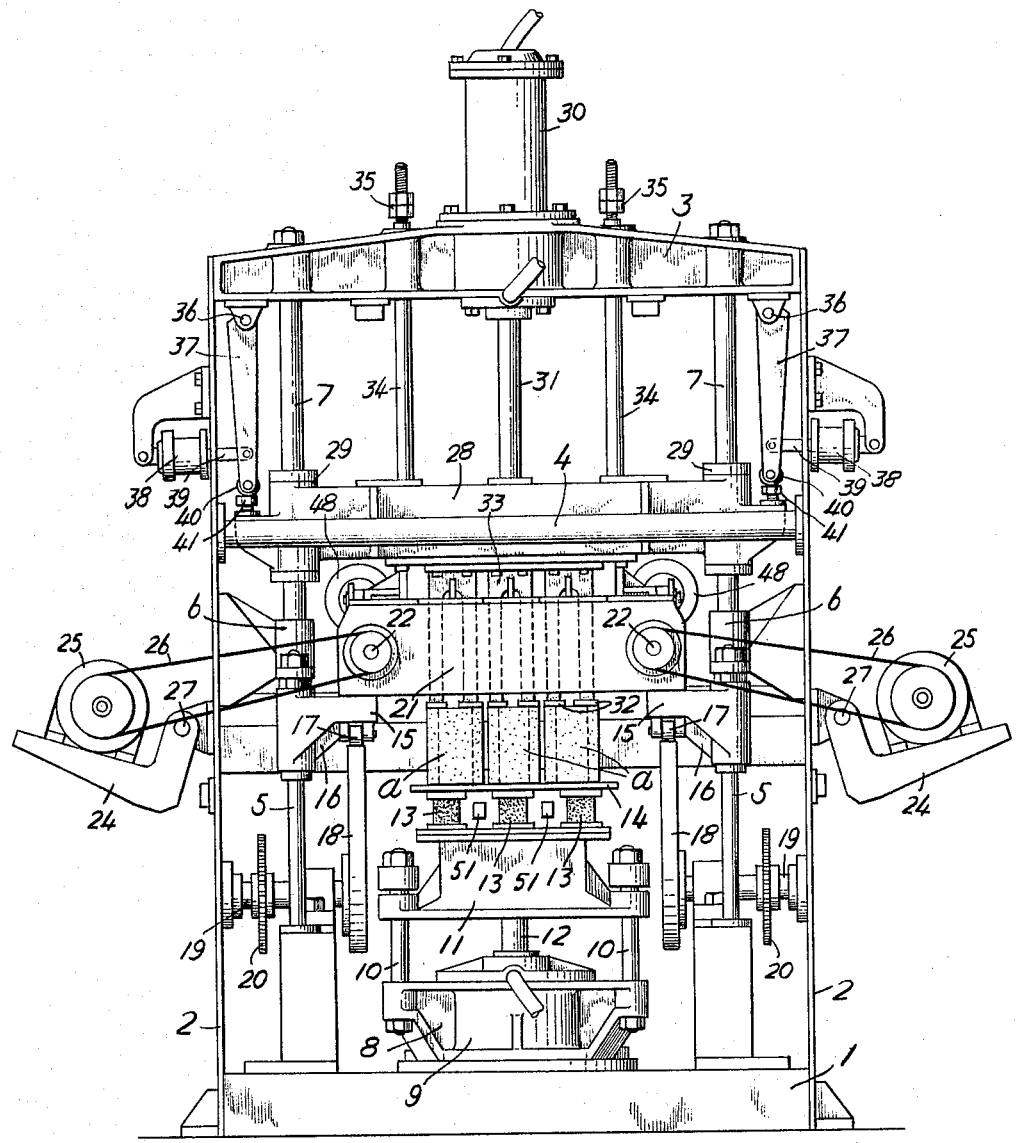
FIGURE 2 is a front view of the machine with the molding frame being removed from a molded concrete block.

Above the supporting arms 15 and the supporting frames 11, the molding frame 21 is provided so that it may be supported directly by the pallet 14 on the upper surface of the supporting frame 11, as shown in FIGURE 1, or be supported directly by the supporting frames 16 and 16 as shown in FIGURE 2. The molding frame 21 has therein a mold frame forming the outer surfaces of a product block, and has on two of its outside surfaces a pair of eccentric rotators 22 pivoted on shafts 23, and each rotator 22 is connected through a belt 26 with a motor 25 mounted on a motor base 24. The motor base 24 is pivotally attached to the machine frame plate 2 by an axis 27, so that even when the molding frame 21 is moved upwardly and downwardly as shown in FIGURES 1 and 2 or is placed at the middle portion thereof the distance between the motor 25 and the eccentric rotator 22 is always kept constant to ensure the power transmission between the two.

An elevating frame 28 is provided above the molding frame 21 by being attached slidably to the guide poles 7 through its guide tubes 29, and is further connected to a piston rod 31 of a piston cylinder 30 attached to the lateral frames 3 and 3. A pressure mold frame 33 having a pressure mold 32 which engages the molding frame 21 for pressing the concrete raw material contained in the molding frame 21, projects downwardly from the elevating frame 28, so that the same may be moved upwardly and downwardly by the piston cylinder 30. The elevating frame 28 has a number of upwardly and vertically projecting guide rods 34 which pass through suitable openings in the lateral frames 3 so that the elevating frame 28 may be given movement in only the vertical direction. When the molding of a block is completed by descent of the elevating frame 28, an adjustable member 35 provided at the top portion of each guide rod 34 lowers, as shown in FIGURE 2, to the position where it abuts the upper surface of the lateral frame 3, and at this time the operation of the piston cylinder 30 is stopped and only the weight of the pressure mold 32 acts on the molded block.

Above the elevating frame 28 and on either side thereof, a holder member 37 is pivotally attached at its upper end portion by an axis 36 to the lateral frame 3 to hang vertically, and the lower portion thereof is connected to a piston rod 39 of a piston cylinder 38 attached to the machine frame plate 2, so that when the pressure mold 32 has been lowered to the position where the molding is completed, the piston cylinder 38 operates to swing the holder member 37 inwardly by the piston rod 39, whereby a roller 40 provided at the lower end of the holder member 37 engages with the upper surface of a projection 41 projecting outwardly from the elevating frame 28 for preventing the upward movement thereof, as shown in FIGURE 2. In this position, the elevating frame 28 is restricted in its upward movement by the holder member 37 at the position where the raw material within the molding frame 21 is pressed by the pressure mold 32 to complete the molding. The removal of the block a from the molding frame 21 can be effected in this state by moving the frame 21 upwardly. After the removal thereof, the holder member 37 returns to its original position by the piston cylinder 38 for releasing the restriction on the elevating frame 28, and the pressure mold frame 33 is accordingly raised by the piston cylinder 30 in readiness for the next operation.

Figure 3:
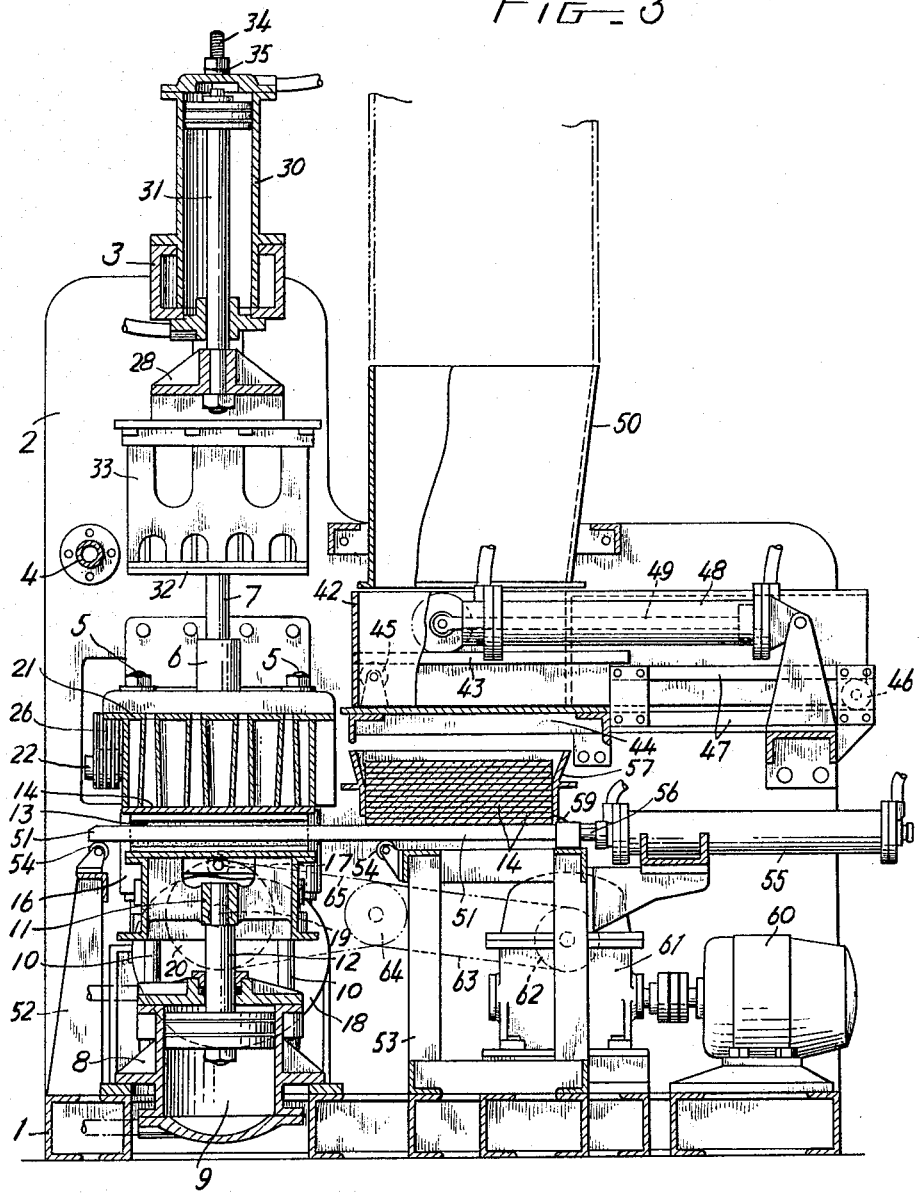
FIGURE 3 is a sectional view taken along the line III—III in FIGURE 1.

At the rear of the molding frame 21 [see FIGURE 3], there is provided a feeding box 42 for feeding concrete raw material to the molding frame 21, which box 42 is provided with flanges 43 along the side surfaces and at the front portion thereof, which flanges rest on rollers 45 provided on lateral bars 44 attached to the machine frame plates 2. The feeding box is also supported with its rollers 46 provided on its outside surfaces at the rear portion thereof between upper and lower rails 47. Feeding box 42 is connected to piston rods 49 of piston cylinders 48 disposed on both sides thereof for being moved forwardly and rearwardly by the piston rods 49. The box 42 is charged with raw material from a feeding hopper 50 disposed above when the same is retreated, and then advances to feed the raw material to the molding frame 21. A reciprocating slidable frame 51 is provided below the molding frame 21 and is supported by rollers 54 provided on leg bases 52 and 53 disposed below, and the same is given forward and rearward movement by a piston rod 56 of a piston cylinder 55 fixed to the lateral frame, so that by the forward movement thereof the block product which has been stripped from the molding frame 21 may be carried out to the exterior of the machine while simultaneously one sheet pallet may be sent to the position beneath the molding frame 21.

A pallet preparing box 57 containing a number of pallets 14 stacked one upon another is provided at the rear of the molding frame 21 in such a manner that a space 58 sufficient to pass one sheet pallet 14 therethrough is formed between the lower edge thereof and the upper surface of the reciprocating slidable frame 51, and the reciprocating slidable frame 51 has a feeding claw 59 which is placed at the rear of the pallet when the frame 51 is retreated, so that by the forward movement thereof only one sheet pallet 14 may be pushed by the claw 59 to advance through the space 58.

Numeral 60 denotes a motor for driving the supporting arms 15. Namely, the motor 60 drives through a reduction gear 61, a pulley 62, a belt 63 and a pulley 64, and said pulley 64 drives through a chain 65 the chain wheel 20 so that by the revolution of the cam wheel 18 on its axis 19 the supporting frame 16 may be moved up and down.

Figure 4:
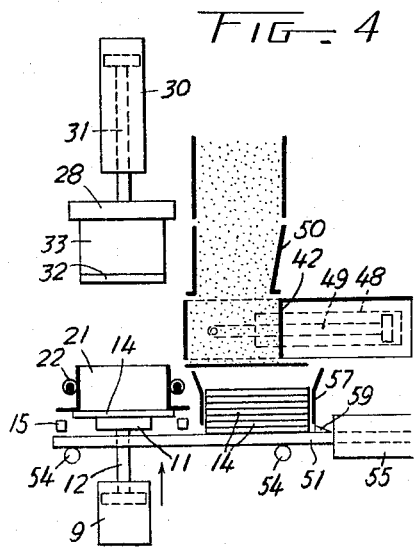
Figure 5:
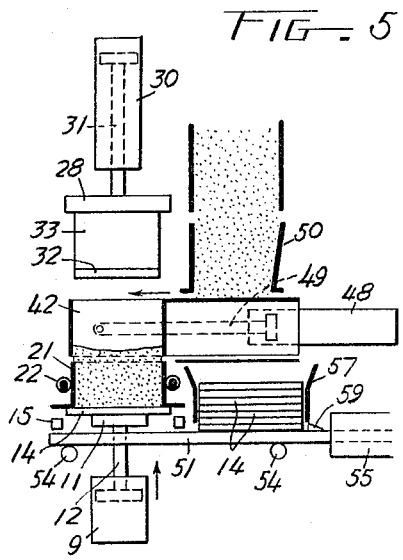
Figure 6:
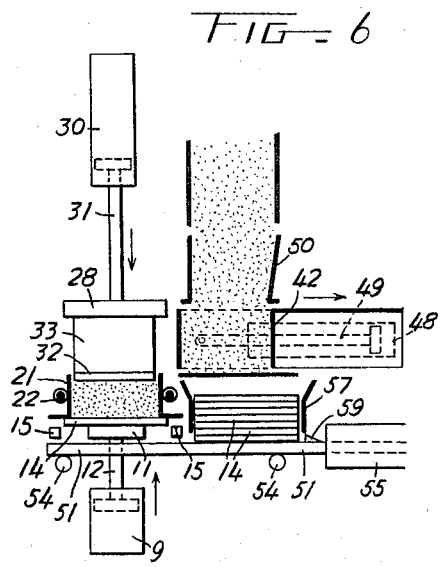

Summary of the manufacturing operation of a concrete block by the present invention machine will be explained with reference to FIGURES 4–10 as follows:

Referring to FIGURE 4, one sheet of pallet 14 is fed beneath the molding frame 21 by the advancement of the reciprocating slidable frame 51 and is moved upwardly by the supporting frame 11 which is pushed up by the piston rod 12 of the piston cylinder 9. The molding frame 21 is pushed up due to the pallet 14 and is supported by the pallet 14 in such a manner that it is kept separate from the supporting arms 15. This corresponds to the position shown in FIGURE 1. Then, as shown in FIGURE 5, the feeding box 42 advances under control of piston rod 56 to a position above the molding frame 21 for charging the raw material contained therein to the molding frame 21. Then, as shown in FIGURE 6, the feeding box 42 retreats and the piston cylinder 30 operates to push the raw material in the molding frame 21 from above by the pressure mold 32. When the molding is completed, the elevating frame is released at that position from the piston cylinder force and is fixed by the holder members 37 not to move upwardly. During the molding period characterized by the pressing of the pressure mold 32, the molding frame 21 is given violent small vibration by the outside eccentric rotators 22 for forming a block of uniform quality. During this molding period, however, the molding frame 21 is supported by the supporting frame 11 but is kept separate from the supporting arms 15 attached to the machine frame, so that no vibration is imparted to the machine frame.

Figure 7:
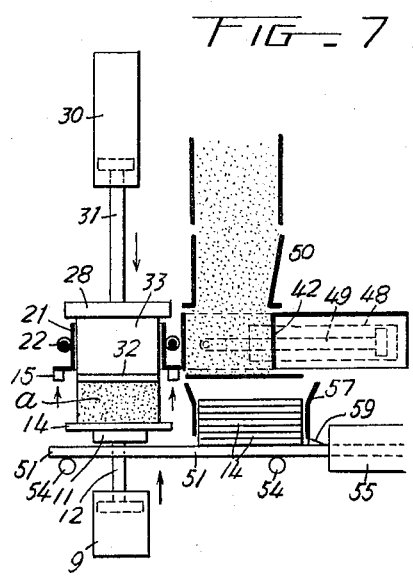

After completion of molding of a block, as shown in FIGURE 7, the supporting arms 15 are elevated by the cams to push up the molding frame 21 so that the frame is moved above the block a for being stripped therefrom. This corresponds to the condition shown in FIGURE 2. Then, as shown in FIGURE 8, the piston rod 12 of the piston cylinder 9 descends to lower the supporting frame 11, carrying the block a through the pallet 14, and descends further from the position where the block a is received through the pallet 14 by the reciprocating slidable frame 51. Then, as shown in FIGURE 9, the reciprocating frame 51 advances to carry out the block a together with the pallet 14 to the exterior of the machine and at the same time feeds one sheet of pallet 14, to be used for the next operation, below the molding frame 21. During this period, the pressure mold frame 33 is released from the restriction imparted by holder member 37 and is moved upwardly by the piston rod 31. Next, as shown in FIGURE 10, the supporting frame 11 moves upwards while supporting the pallet and the molding frame 21 is lowered by the lowering movement of the supporting arms 15, whereby the molding frame 21 is placed on the upper surface of the pallet. The supporting arms 15 are lowered still further to a point below the pallet 14 for as to be separated from the molding frame 21. Then, the block *a* is taken away and the reciprocating slidable frame 51 is retreated to the position shown in FIGURE 4. This operation may be repeated as often as is desired.

Thus, in the present invention machine, the molding frame 21 is supported only by the supporting frame 11 movable up and down by the piston rod 12 of the piston cylinder 9 fixed on the machine base 1 and is kept separate from the supporting arms 15 attached to the machine frame during the time when the molding of a block *a* is carried out such that the raw material within the molding frame 21 is pressed from above by the eccentric rotators 21. The transmission of the vibration to the molding frame 21 to the machine frame is prevented thus avoiding any deformation or injury of other portions of the machines by such vibration to maintain the machine in reliable operating condition as well as decreasing the amount of power for causing the vibration. Furthermore, it has been usual with the conventional machine that on removal of the molded block from the molding frame pressure is applied directly to the block from above or below for extruding the block from the molding frame. As, in this conventional type of machine, pressure is applied directly to the block, the block is often deformed or injured by the pressure. In the present invention machine, however, the removal of the product block from the molding frame is carried out by moving the molding frame 21 upwardly by the supporting arms 15 under the condition that the block is supported at its bottom surface by the stable supporting frame through the pallet and along its top surface by the pressure mold which is fixed not to move upwardly, so that no such deformation can occur, as in the conventional machine and there can be obtained extremely accurate blocks.

Although there has been described a preferred embodiment of this novel invention, many variations and modifications will now be apparent to those skilled in the art. Therefore, this invention is to be limited, not by the specific disclosure herein, but only by the appending claim.

The embodiments of the invention in which an exclusive privilege or property is claimed are defined as follows:

Means for producing concrete blocks of superior strength and homogeniety comprising a machine main frame; first movably mounted mold frame means open at the top and bottom thereof; second means for positioning a pallet beneath said first means; third piston means secured to said main frame for lifting said pallet into engagement with said first means; fourth piston operated means for discharging concrete material into said mold frame; fifth piston operated means secured to said main frame for pressing said concrete in said mold; sixth vibrating means for imparting violent vibrations to said first means to enhance the homogeniety of said concrete material; said third and said fifth means cushioning said main frame from vibration during operation of said sixth means; seventh means mounted to said main frame for lifting said mold frame away from said pressed concrete when said concrete is engaged by said third and fifth means; said sixth means comprising a motor base pivotally coupled at one end to said machine main frame; a motor having a motor shaft; said motor being mounted upon said motor base; an eccentric rotator pivotally mounted to said movably mounted machine frame; a belt coupling said motor shaft to said eccentric rotator; said motor base pivotal coupling being positioned above an imaginary line drawn between said eccentric rotator and said motor shaft to substantially prevent rotation of said motor base; said first means having flanges on opposite sides thereof; said seventh means including cam means slidably engaging said flanges for lifting said mold frame means above the finished concrete block.

References Cited by the Examiner

UNITED STATES PATENTS

| | | | |
|---|---|---|---|
| 700,746 | 5/1902 | Davies | 25—56 |
| 805,914 | 11/1905 | Horr | 25—120 |
| 1,433,204 | 10/1922 | Hodges | 25—120 |
| 1,905,975 | 4/1933 | Thomas | 25—41 |
| 2,298,074 | 10/1942 | Straub | 25—41 |
| 2,366,780 | 1/1945 | Gelbman et al. | 264—71 |
| 2,470,377 | 5/1949 | Shepeck | 25—41 |
| 2,496,016 | 1/1950 | Nelson | 25—42 |
| 2,615,228 | 10/1952 | Regan | 25—41 |
| 2,706,322 | 4/1955 | Davies et al. | 264—71 |
| 2,961,730 | 11/1960 | Marino | 25—41 |

FOREIGN PATENTS

37/14916 9/1962 Japan.

J. SPENCER OVERHOLSER, *Primary Examiner.*

A. H. BRODMERKEL, *Examiner.*

J. A. FINBYSON, JR., G. A. KAP, R. D. BALDWIN,
*Assistant Examiners.*